United States Patent [19]

Nelson

[11] 3,995,664
[45] Dec. 7, 1976

[54] FLOW CONTROL DEVICE

[76] Inventor: Walter R. Nelson, 2501 Redondo Beach Blvd., Gardena, Calif. 90249

[22] Filed: Mar. 13, 1975

[21] Appl. No.: 558,071

[52] U.S. Cl. .................................. 138/43; 138/36; 138/42
[51] Int. Cl.² ....................... F15D 1/14; B05B 1/26
[58] Field of Search ................. 138/36, 42, 43; 137/625.28, 625.3; 251/125, 127; 181/35 A, 36 B, 36 R; 239/542, 553, 590.3

[56] References Cited

UNITED STATES PATENTS

| 1,938,475 | 12/1933 | Alexander | 138/36 X |
|---|---|---|---|
| 1,962,168 | 6/1934 | Andrus | 138/36 X |
| 2,236,084 | 3/1941 | Brown | 138/43 |
| 2,289,905 | 7/1942 | Dasher | 138/43 X |
| 2,813,541 | 11/1957 | Beller | 138/43 X |
| 3,130,917 | 4/1964 | Aghides | 239/590.3 X |
| 3,882,892 | 5/1975 | Menzel | 138/43 X |

FOREIGN PATENTS OR APPLICATIONS

| 510,324 | 12/1929 | Germany | 138/36 |
|---|---|---|---|
| 350,716 | 6/1931 | United Kingdom | 138/42 |

*Primary Examiner*—Richard E. Aegerter
*Assistant Examiner*—James E. Bryant, III
*Attorney, Agent, or Firm*—Fraser and Bogucki

[57] ABSTRACT

A fluid flow control device is disclosed for maintaining a substantially constant volumetric flow rate in either direction independent of the applied pressure above a predetermined pressure level. The device has a generally cylindrical shape, may be symmetrical about a radial plane of symmetry and comprises an elastomeric member disposed between rigid, slotted end plates. The elastomeric member comprises a central disk portion each of whose faces have axially disposed projections including an outer rim structure, a central boss and a series of spaced flow control segments arranged along a circle lying intermediate the rim structure and boss and defining variable area flow passages. The rim structure and flow control segments define an outer circular channel while the flow control segments and boss define an inner circular channel. The inner channels on opposite sides of the elastomeric member are joined by orifices formed in the disk portion of the member. The outer and inner channels, flow passages and orifices define tortuous fluid paths for establishing an adequate pressure drop across the device. During operation, the elastomeric member is compressed and deformed to vary the flow areas of the flow passages in accordance with the applied pressure to maintain a substantially constant volumetric flow rate through the device.

The outer cylindrical surface of the elastomeric member is adapted to sealingly engage the inside wall surface of the conduit within which it is mounted. In accordance with another aspect of the disclosure, the wall of the conduit is provided with an aperture normally sealed by the elastomeric member. Visual indication of the absence or deterioration of the control device is provided by water seeping from the aperture.

16 Claims, 6 Drawing Figures

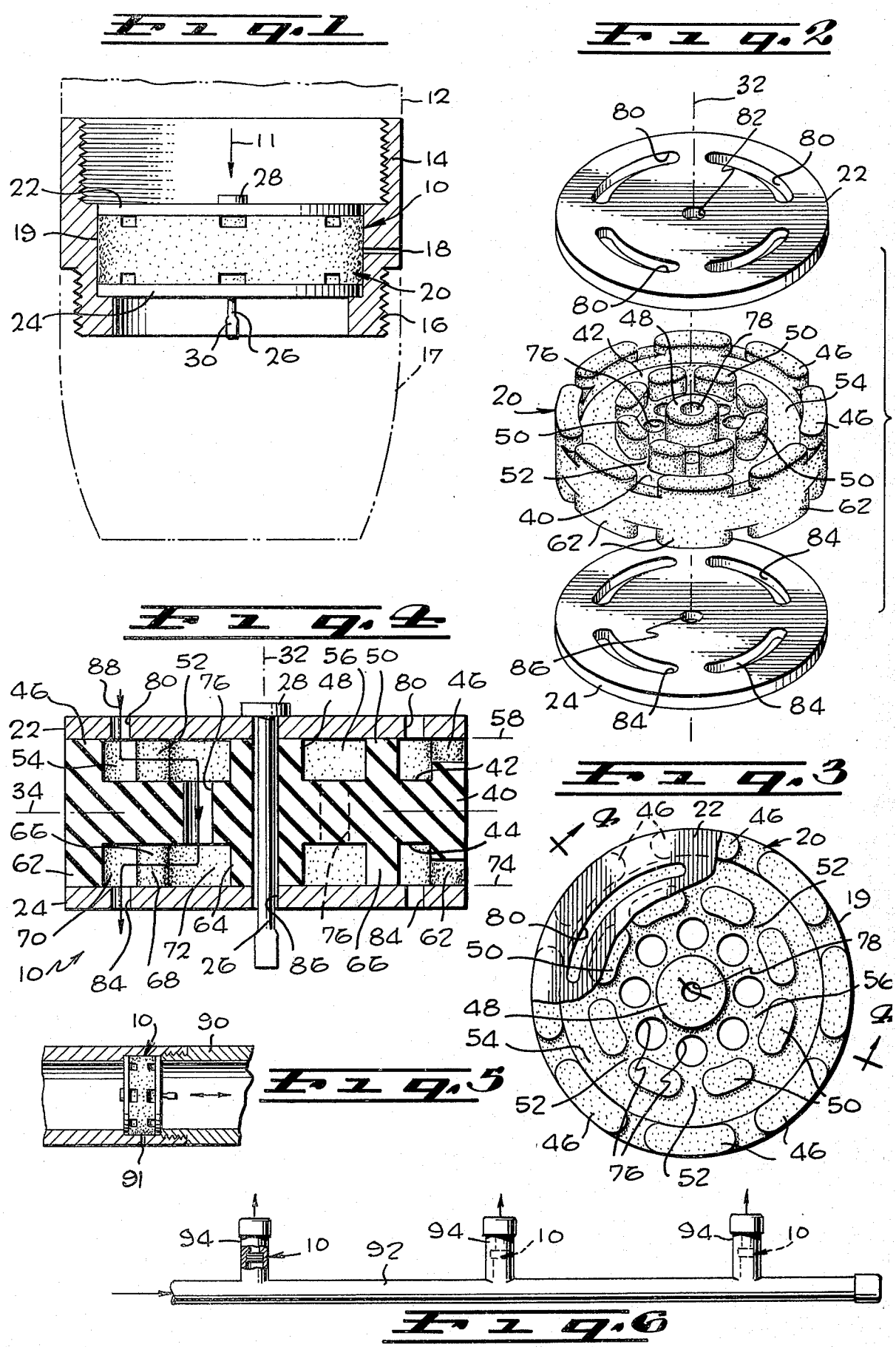

FLOW CONTROL DEVICE

BACKGROUND OF THE INVENTION

1. Field of the Invention

This invention relates generally to flow control apparatus and particularly to a device having a variable, pressure-responsive restriction for maintaining a substantially constant flow rate above a predetermined supply pressure irrespective of the pressure drop across the device and the direction of flow in the conduit in which the device is installed.

2. History of the Prior Art

Various kinds of fluid flow devices presently exist for maintaining a predetermined volumetric flow rate irrespective of variations in the supply pressure. Such devices are typically found in water fountains, faucets and like installations and are presently assuming increasing importance as greater consideration is given the conservation of water.

Certain flow control devices of the prior art employ one or more elastomeric members deformable in some fashion by the applied fluid pressure to vary the flow restricting cross-sectional area of a channel, orifice or the like in accordance with the pressure but such devices have several drawbacks.

For example, in almost all instances these devices are directional, that is, they control the flow rate in only one direction of fluid flow and therefore must be installed with the correct orientation in order to function properly.

Further, short of complete disassembly of the conduit means in which the control device is installed, there is no way of readily ascertaining whether the elastomeric member has deteriorated and requires replacement, or whether the flow control device is in place at all.

SUMMARY OF THE INVENTION

The flow control device of the present invention, besides providing improved flow control characteristics, is capable of controlling fluid flow in either direction. Thus, the device of the invention cannot be installed incorrectly and further can control the flow rate in a conduit within which fluid may flow in either direction.

The structure of the present flow control device further permits verification of its presence and the condition of the elastomeric control member without disassembly of the conduit means housing the device.

In accordance with the broader aspects of the invention, the flow control device comprises a generally cylindrical elastomeric member sandwiched between a pair of relatively rigid end plates. The elastomeric member includes a disk portion having opposed faces from each of which an outer rim structure projects. Also projecting from each face of the disk portion is a series of spaced-apart flow control segments, adjacent segments defining between them variable area flow passages. The outer rim structure and the flow control segments on each side of the disk portion define an outer, generally circular channel. A plurality of orifices is disposed radially inward of the flow control segments and extend through the disk portion. The end plates have openings in communication with the outer circular channels for conducting fluid into and out of the device. The outer circular channel and flow passages on one side of the disk portion and the outer circular channel and flow passages on the other side of the disk portion, together with the orifices, define a tortuous fluid flow path establishing a pressure drop across the device. The variable flow passages form flow restrictions that vary in accordance with the pressure drop; increases in the pressure drop tend to increasingly compress and deform the flow control segments to reduce the flow area of the flow passages. The volumetric flow rate is thereby held substantially constant above a predetermined supply pressure level.

By constructing the device symmetrically about a central, radial plane, the controlled flow rate will be substantially the same in either direction of fluid flow.

As a further aspect of the invention, the flow control device of the invention has a structure which additionally lends itself to the above-mentioned verification. In this connection, the outer cylindrical surface of the elastomeric member sealingly engages the interior surface of the conduit means within which the control device is mounted. The portion of the wall of the conduit means engaged by the device is provided with a small aperture which is normally sealed by the elastomeric member. Removal of the control device or substantial deterioration of the elastomeric member, however, will allow fluid to seep out of the aperture thereby providing a visual indication of the absence or deterioration of the device.

BRIEF DESCRIPTION OF THE DRAWINGS

Further objects, advantages and features of the invention will become apparent from the following detailed description taken in conjunction with the accompanying drawings, in which:

FIG. 1 is a side elevation view, partly in section, of a portion of a water spout assembly incorporating a flow control device according to the present invention;

FIG. 2 is an exploded, perspective view of tthe flow control device of FIG. 1;

FIG. 3 is a top view, partly broken away, of the flow control device of FIG. 1;

FIG. 4 is a side elevation view, in section, of the flow control device of the invention as seen along 4—4 in FIG. 3;

FIG. 5 is a side elevation view, partly in section, of a conduit incorporating the flow control device of the invention and in which the device controls flow rate bidirectionally; and FIG. 6 is a top view, partly in section, of a portion of an agricultural irrigation system employing a plurality of flow control devices according to the present invention.

DETAILED DESCRIPTION

FIG. 1 shows a flow control device 10 according to the present invention in a typical spout assembly in which water flows in a direction indicated by the arrow 11. Although the spout assembly of FIG. 1 typifies a faucet installation, it will be appreciated that the device 10 has general utility and may be employed in shower arms, drinking fountains, or the like, as well.

When the pressure of the water upstream of the device 10 is below a predetermined pressure level the device has little regulatory effect and the volumeric flow rate increases as the pressure increases. When the upstream fluid pressure reaches the predetermined level the flow control device 10 begins immediately to operate to limit and maintain constant the volumetric flow rate irrespective of further increases or variations above the predetermined pressure level in the upstream pressure.

The end of the spout is shown in phantom at 12 and threadedly secured thereto is an adapter conduit 14 having lower, external threads 16 for receiving an aerator unit 17 also shown in phantom. The aerator unit 17 does not form any part of the present invention; however, it will be evident that the flow control device 10 may be incorporated in the aerator unit 17 (or likewise, in the spout 12) in various ways without the use of the adapter conduit 14. The adapter conduit 14 has a small aperture 18 extending through the wall thereof.

Turning now also to FIGS. 2–4, the flow control device 10 has a generally cylindrical shape defined by an outer cylindrical surface 19.

The flow control device 10 is basically a three-piece assembly comprising an elastomeric member 20 and a pair of substantially rigid end plates 22, 24 between which the elastomeric member 20 is sandwiched. A pin 26 having a head 28 and a shank with an enlarged end 30 may be used to loosely join the member 20 and end plates 22, 24 as best seen in FIG. 4.

For reference purposes the flow control device 10 has a central, longitudinal axis 32 and is preferably constructed so as to be substantially symmetrical about a plane 34 extending radially, that is, perpendicular to the axis 32.

The elastomeric member 20 is preferably molded as a unitary structure from any suitable, heat resistant, resilient material, for example, ethylene propylene rubber (EPR), and includes a central disk portion 40 having opposed, parallel faces 42 and 44 symmetrical of the plane 34. The outer cylindrical surface of the member 20 is adapted to sealingly engage the interior of the conduit, such as the adapter conduit 14, in which the device 10 is installed. The device 10 is positioned so that the aperture 18 is sealed off from the interior of the conduit.

Projecting axially from the face 42 along the periphery thereof is a rim 46 which may be formed as a continuous, that is, non-segmented, structure. Preferably, however, the rim 46 is slotted along at least a portion of its height to define a number of arcuate rim segments in order to increase the compressibility of the elastomeric member 20. Eight (8) such segments are shown by way of example.

Also projecting from the face 42 are a central boss 48 and a series of arcuate, spaced-apart flow control segments 50 disposed radially intermediate the rim structure 46 and the boss 48. The flow control segments 50 lie generally along a circle concentric with the rim structure 46 and the segments 50 are separated by flow passages 52.

The rim structure 46 and flow control segments 50 define between them an outer, generally circular channel 54. Similarly, the flow control segments 50 and the boss 48 define an inner, generally circular channel 56 concentric with the outer channel 54.

The rim structure 46, the boss 48 and the flow control segments 50 all have the same height and have planar end surfaces lying in a common end of plane 58 parallel with the plane of symmetry 34.

The features of the elastomeric member 20 on the other side of the symmetrical plane 34, that is, the elements projecting from the disk face 44, are identical to those already described. Thus, rim structure 62, boss 64 and flow control segments 66 are identical to the rim structure 46, boss 48 and flow control segments 50, respectively, and define flow passages 68, an outer circular channel 70 and an inner circular channel 72 identical to passages 52 and channels 54, 56, respectively. Likewise, the height of the rim structure 62, boss 64 and segments 66 are equal and identical to the height of their counterparts on the other side of the disk and also have planar end surfaces lying in a common end plane 74 parallel to the plane of symmetry 34.

The inner circular channels 56 and 72 are in communication via a circular array of orifices 76 formed in the disk portion 40. Further, a hole 78 lying on the axis 32 extends through the member 20 for receiving the pin 26.

Although it will be understood that virtually any number of flow control segments 50 and orifices 76 may be used, eight (8) of each of these elements are shown by way of example.

The rigid end plates 22 and 24 may be fabricated of any corrosion resistant metal, such as brass or plastic. They are preferably identical and comprise generally disk-shaped elements having approximately the same outer diameter as the member 20. End plate 22 overlies and is adapted to engage the rim segments 46, boss 48 and flow control segments 50 along the end plane 58. Plate 22 has a plurality of openings, preferably in the form of arcuate slots 80 in communication with the outer circular channel 54 and a central aperture 82 for receiving the pin 26. In identical fashion, the plate 24 has arcuate slots 84 and an aperture 86 and overlies and is adapted to engage the rim structure 62, boss 64 and flow control segments 66 along the common end face plane 74.

The outer and inner circular channels 54, 56, 70 and 72 together with the flow passages 52 and 68 and the orifices 76 define a tortuous fluid path through the flow control device 10 as best shown by the arrow 88 in FIG. 4. The path, which, as seen in side elevation, has four right angle turns, helps to establish a pressure drop across the device 10 that is sufficient for the proper flow control operation of the device. Thus, fluid entering in a generally axial direction through the slots 80 in plate 22 and into the outer channel 54 is turned approximately 90° to flow radially inward through the flow passages 52 into the inner circular channel 56. From there, the fluid again turns to flow in an axial direction through the orifices 76 and into the inner circular channel 72 from where, after another turn, it flows generally radially outward through the passages 68 to the outer circular channel 70. The fluid undergoes a last change of direction to emerge in an axial direction out of the device 10 through the arcuate slots 84 in the plate 24.

It will be appreciated that as the pressure applied to the device rises the elastomeric member 20 is subjected to increasing axial compression resulting in greater deformation thereof. In particular, increasing compression and deformation of the flow control segments 50 and 66 have the effect of reducing the flow area of the flow passages 52, and 68 so that as the upstream pressure applied to the device increases, the increasing restriction of the flow passages tends to compensate for the increase in pressure and thereby maintain the volumetric flow rate (gpm) substantially constant.

The action described is minimal below a predetermined, minimum pressure and for such low pressures the flow rate increases as pressure increases. When the predetermined pressure level is reached however, the device 10 immediately begins to control volumetric flow rate and holds it constant without the introduction of transients and irrespective of increases in pressure or variations thereof, so long as such variations remain above the minimum predetermined level.

It will be appreciated that the operating characteristics of the device 10, including the predetermined minimum pressure level at which flow control commences as well as the flow rate that is maintained above the predetermined pressure, are affected by a number of parameters such as the Durometer number or Shore hardness of the elastomeric material from which member 20 is fabricated, the size of the flow passages in the uncompressed state of the member 20, the size and number of orifices 76, and so forth.

The aperture 18 in the wall of the adapter conduit 14 provides a means for readily verifying the presence of the flow control device 10 and its condition. The absence of the device 10 or substantial deterioration of the elastomeric member 20 will be immediately evident by the water seeping out of the aperture 18.

Another advantage of the flow control device of the invention is that it may be readily cleaned. This is made possible by the loose connection of the plates 22, 24 and the elastomeric member 20 afforded by the pin 26. As best seen in FIGS. 1 and 4, the length of the pin is somewhat greater than the overall thickness of the device 10 permitting the plates 22, 24 to be moved away from the member 20 thereby facilitating the purging of sand and other debris accumulated within the circular channels, orifices and flow passages.

In FIG. 5, the flow control device 10 is shown installed in a conduit 90 in which fluid can flow in either direction. Since the device 10 can control flow bidirectionally, a constant predetermined volumetric flow rate will be maintained in each direction. A verification aperture 91 similar to the aperture 18 already discussed may be provided in the wall of the conduit 90.

FIG. 6 shows a portion of an agricultural irrigation system including a main feeder pipe 92 having a plurality of parallel branch pipes 94. Each branch pipe encloses a flow control device 10 in accordance with the invention. By maintaining a low, constant flow rate of water from each branch pipe 94, uniform irrigation is achieved along the entire length of the feeder pipe 92 irrespective of the pressure drops along the pipe or differences in elevation between different portions of the pipe 92.

What is claimed is:
1. A bidirectional flow control device comprising:
a generally cylindrical elastomeric, resilient member having a longitudinal axis and including:
a disk portion having opposed faces;
an outer rim structure projecting from each face;
a generally circular array of spaced-apart flow control segments projecting from each face, the segments defining flow passages, the rim structure and flow control segments defining a generally circular outer channel; and
a plurality of orifices extending through the disk portion, the orifices being disposed radially inward of the flow control segments; and
a rigid end plate overlying and in contact with the flow control segments and rim structure on each side of the disk portion, each plate having openings in communication with the outer circular channel; the outer circular channels, flow passages and orifices defining a tortuous flow path through the device, the flow passages forming flow restrictions that vary in accordance with the pressure applied to the device.

2. A flow control device, as defined in claim 1, in which:
a central boss projects axially from each face of the disk portion, the flow control segments and boss projecting from each face defining a generally circular inner channel, the orifices joining the inner channels.

3. A flow control device, as defined in claim 1, in which:
the rim structure includes a plurality of spaced-apart, arcuate rim segments.

4. A flow control device, as defined in claim 1, in which:
the device is constructed symmetrically about a central plane extending radially of the longitudinal axis.

5. A fluid flow control device for controlling the flow of fluid in a conduit in either direction, comprising:
an elastomeric, resilient member having an outer, generally cylindrical surface and a longitudinal axis and including:
a disk portion having opposed faces;
an outer rim structure projecting from each face;
a generally circular array of spaced-apart flow control segments projecting from each face, adjacent segments defining flow passages, the rim structure and flow control segments defining a generally circular outer channel; and
a plurality of orifices extending through the disk portion, the orifices being disposed radially inward of the flow control segments; and
a rigid end plate overlying and in contact with the flow control segments and rim structure on each side of the disk portion, each plate having openings in communication with the outer circular channel; the outer circular channels, flow passages and orifices defining a tortuous flow path through the device to establish a pressure drop across the device, the elastomeric member being compressible and deformable in accordance with the pressure applied to the device, whereby the flow passages form flow restrictions that vary in accordance with the pressure drop across the device.

6. A fluid flow control device, as defined in claim 5, in which:
a central boss projects axially from each face of the disk portion, the flow control segments and boss projecting from each face defining a generally circular inner channel, the orifices joining the inner channels.

7. A fluid flow control device, as defined in claim 5, in which:
the rim structure includes a plurality of spaced-apart, arcuate rim segments.

8. A fluid flow control device, as defined in claim 5, in which:
a elastomeric member and end plates are loosely joined by a central pin extending through the bosses and disk portion.

9. A fluid flow control device, as defined in claim 5, in which:
the device is constructed symmetrically about a central plane extending substantially perpendicular to the longitudinal axis.

10. A flow control device for use in a conduit comprising:

an elastomeric, resilient member having a longitudinal axis, a radial plane of symmetry perpendicular to the longitudinal axis and an outer, generally cylindrical surface the member comprising:
- a disk portion having opposed, planar, radially-extending surfaces symmetrical of the plane of symmetry;
- an outer, circumferential rim structure projecting axially from each disk surface;
- a central boss extending axially from each disk surface;
- a plurality of arcuate flow control segments projecting axially from each disk surface radially intermediate the central boss and the outer circumferential rim, the flow control segments lying generally along a circle concentric with the rim and spaced-apart to define variable area flow passages, the rim, flow control segments and boss having outer surfaces lying in a common radial plane, the common radial planes being symmetrical of the plane of symmetry, the rim and the flow control segments defining an outer circular channel and the flow control segments and central boss defining an inner circular channel concentric with the outer circular channel; and
- a plurality of axially extending orifices in the disk portion connecting the inner circular channels; and
- a rigid end plate overlying and in contact with the outer planar surfaces of the rim, flow control segments and boss projecting from each surface of the disk, each end plate having arcuate slots in communication with the outer circular channel whereby fluid entering the device through the slots in one of the end plates and exiting from the slots in the other end plate follows a tortuous path defined by the outer circular channels, variable flow passages, inner circular channels and orifices thereby creating a pressure drop across the device, the applied pressure causing compression and deformation of the flow control segments to vary the flow area of the passages between adjacent segments in accordance with the pressure drop.

11. A flow control device, as defined in claim 10, in which:
an axially oriented, center pin loosely joins the end plates and elastomeric member.

12. A flow control device as defined in claim 10 in which:
the rim structure includes a plurality of spaced-apart, arcuate rim segments.

13. Fluid flow apparatus comprising:
a conduit for conducting the flow of fluid and having a bore, a wall and an aperture through the wall; and
a flow control device disposed across the bore of the conduit, the device including an elastomeric, resilient member having (i) an outer, generally cylindrical surface in sealing engagement with the wall of the conduit, the outer surface of the member extending across the aperture to prevent fluid flow therethrough, (ii) a disk portion having opposed faces, (iii) an outer rim structure projecting from each face, (iv) a generally circular array of spaced-apart flow control segments projecting from each face, the segments defining flow passages, the rim structure and flow control segments defining a generally outer circular channel, and (v) a plurality of orifices extending through the disk portion, the orifices being disposed radially inward of the flow control segments; and a rigid end plate overlying and in contact with the flow control segments and rim structure on each side of the disk portion, each plate having opening in communication with the outer circular channels, flow passages and orifices defining a tortuous flow path through the device to establish a pressure drop across the device, the elastomeric member being compressible and deformable in accordance with the pressure applied to the device, whereby the flow passages form flow restrictions that vary in accordance with the pressure drop across the device, removal of the device or substantial deterioration of the elastomeric member causing fluid to escape through the aperture to provide a visual indication of such removal or deterioration.

14. A fluid flow apparatus, as defined in claim 13, in which:
the flow control device has a longitudinal axis and is constructed symmetrically about central plane extending substantially perpendicular to the axis.

15. A fluid flow apparatus, as defined in claim 13, in which:
a central boss projects axially from each face of the disk portion, the flow control segments and boss projecting from each face defining an inner, generally circular channel, the inner circular channels being joined by the orifices.

16. A fluid flow apparatus, as defined in claim 13, in which:
the rim structure includes a plurality of spaced apart arcuate rim segments.

* * * * *